United States Patent [19]
Lodge

[11] 3,810,582
[45] May 14, 1974

[54] IRRIGATION SYSTEM
[75] Inventor: Hilmer G. Lodge, Pala, Calif.
[73] Assignee: Conflow Irrigation Systems, San Diego, Calif.
[22] Filed: Oct. 16, 1972
[21] Appl. No.: 297,959

Related U.S. Application Data
[63] Continuation-in-part of Ser. No. 131,225, April 5, 1971, abandoned.

[52] U.S. Cl................. 239/542, 239/562, 239/582, 137/608
[51] Int. Cl............................................. B05b 1/14
[58] Field of Search.......... 61/13, 12; 137/608, 610; 239/542, 110, 547, 450, 581, 582, 76, 562

[56] References Cited
UNITED STATES PATENTS

| | | | |
|---|---|---|---|
| 2,598,961 | 6/1952 | Andrus | 239/542 UX |
| 2,535,310 | 12/1950 | Mattison | 239/582 X |
| 3,036,783 | 5/1962 | Hansen | 239/547 X |
| 1,042,501 | 10/1912 | Thompson | 61/13 |
| 2,148,419 | 2/1939 | Parker | 61/12 X |
| 960,393 | 6/1910 | Peters | 239/110 |
| 1,259,211 | 3/1918 | Coles | 239/110 |
| 3,550,854 | 12/1970 | Fischer | 239/155 |

Primary Examiner—M. Henson Wood, Jr.
Assistant Examiner—John J. Love
Attorney, Agent, or Firm—Lyon & Lyon

[57] ABSTRACT

An irrigation system utilizing a set of irrigation devices joined to risers connected to a common supply line, the supply line terminating in a flush member adapted, when open, to permit flushing of the supply line to remove particulate matter; each irrigation device including a distributor manifold having a set of outlets connected to corresponding distributor tubes of small diameter, and a metering valve, the valve having means for causing turbulent flow to effect pressure reduction prior to entrance of water into the distributor tubes.

6 Claims, 9 Drawing Figures

IRRIGATION SYSTEM

This application is a continuation-in-part of the following application, now abandoned:

Ser. No. 131,225, filed Apr. 5, 1971, for MULTIPLE OUTLET IRRIGATION DEVICE.

BACKGROUND OF THE INVENTION

A highly desirable goal in irrigation practice is to eliminate runoff. It has been well known for many years that if the water can be applied at a slow enough rate, better crops are produced and little or no runoff or erosion occurs. The slower the watering, the deeper the penetration. This is especially desirable for trees, shrubs and other plants which remain fixed in place, for as the water seeps deeper, it also spreads, causing the roots to spread downward and outward.

While the goal is well recognized, it is not easily attained. Although the disadvantages are quite apparent, the conventional approach has been by means of sprinklers. Some gains have been made to reduce the rate of distribution of the water from sprinklers. Porous hoses or "soil soakers" have been used. A technique known as "drip irrigation" has developed. An example of this approach is found in U.S. Pat. No. 3,420,064, wherein a network of piping is laid out with a drip device located every few feet. The system may be surface or sub-surface located; however, though effective, it is extremely expensive to install and maintain. Other drip systems such as that represented by U.S. Pat. No. 3,512,525 share the same problem of expensive installation and maintenance.

As a result, the principal system of irrigation has been by use of sprinklers, either the moving or fixed type. In the irrigation of fixed-root type of crop, such as trees, large sprinklers are used which extend above the trees, one sprinkler watering a group of trees and the pattern of sprinklers being such that a reasonably uniform distribution of water is attained, as the water passes downwardly through the trees and drips on the ground. The water falling between the trees is mostly wasted, and operation is dependent on reasonably still air, as wind materially disturbs distribution. The goal of uniform distribution is not always desirable, for this presupposes uniform soil conditions, as well as uniform tree size, and level land as well.

SUMMARY OF THE INVENTION

The present invention seeks to overcome the problems outlined above and is summarized in the following objects:

First, to provide an irrigation system which is particularly suitable, but not limited to, the irrigation of trees and is so arranged that a series of irrigation devices may be arranged for the supply of water to each tree, each device being individually adjustable to meet the needs of its corresponding tree, the water being discharged onto the ground in small streams to eliminate runoff or drift of the water during severe wind conditions.

Second, to provide an irrigation system utilizing a novelly arranged irrigation device in which a single valve controls the water supply to a manifold having a plurality of outlets, thus permitting the use of a larger valve which is less likely to be obstructed by particulate matter, the valve and manifold also arranged to cause turbulent flow within the manifold which effect substantial pressure reduction below supply line pressure, permitting further increase in valve port opening for a given outlet flow.

Third, to provide an irrigation device, as indicated in the preceding object, wherein the manifold outlets are connected to a set of highly flexible distributor tubes of small diameter which are capable of conforming to the ground surface or be superficially covered, the tubes being of such length that their discharge ends may be located in a uniform pattern within the drip line of the tree or other pattern best suited to the needs of the tree.

Fourth, to provide an irrigation device, as indicated in the preceding object, wherein the distributor tubes of small diameter may be tied in knots to reduce or close off flow in selected tubes, or joined together by a sleeve to close off a pair of tubes, or joined by a sleeve to a tube extension of similar size, or joined to a larger tube to extend the range without significant loss in discharge flow.

Fifth, to provide an irrigation system wherein each supply line serving a plurality of irrigation devices terminates in a removable fitting which permits the supply line to be flushed for removal of particulate matter.

Figure 1:
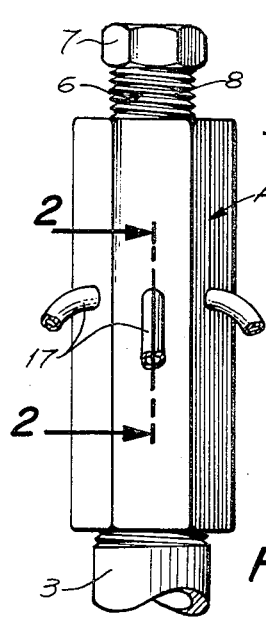
FIG. 1 is a side view of an irrigation device employed in the irrigation system mounted on a riser shown fragmentarily.
Figure 2:
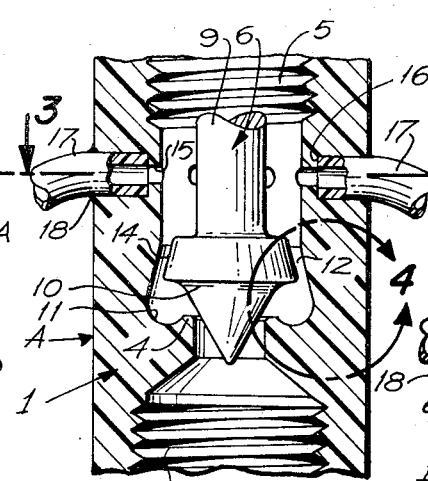
FIG. 2 is an enlarged fragmentary sectional view thereof taken through 2—2 of FIG. 1.
Figure 3:
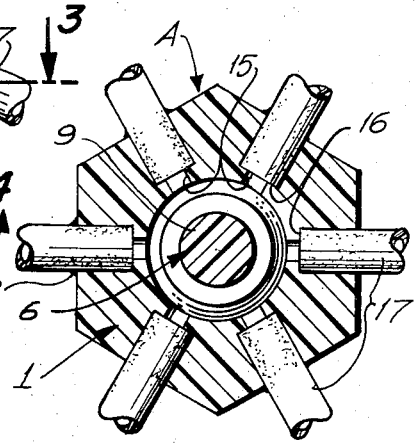
FIG. 3 is a transverse sectional view taken through 3—3 of FIG. 2.

The irrigation system includes a multiple outlet irrigation device A having a manifold body 1, which is tubular and includes an internally screwthreaded lower end 2, which receives a riser 3. Above the screwthreads 2, the bore of the manifold body is reduced in diameter to form a valve seat 4. The manifold body is also provided with an internally screwthreaded upper end 5.

The manifold body 1 receives a valve member 6, having a slotted or polygonal tool receiving outer end 7 and a screwthreaded stem portion 8 which fits the internally screwthreaded upper end 5 of the manifold body. Below the screwthreaded stem portion 8, the valve member includes a portion of reduced diameter 9 and terminates in a tapered valve head 10, which engages the valve seat 4.

It has been found that operation of the valve is materially improved by providing a toroidal chamber 11 in the manifold body above and surrounding the valve seat 4. The chamber merges into an upwardly tapered portion 12. The valve head 10 is provided with a curved flange 13, essentially complementary to the toroidal chamber 11, and an upwardly converging portion 14 confronting the tapered portion 12.

Flow through the opening between the valve head 10 and valve seat is deflected by the flange 13 into a toroidal path by the chamber and creates a back pressure which reduces flow between the tapered portions 12 and 14 for a given supply line pressure. In the portion of the manifold body 1 above the valve seat 4 and surrounding the region occupied by the valve portion of reduced diameter 9 is a ring of side outlets 15, the inner ends of which are reduced in diameter forming shoulders 16. Each side outlet receives an end of a distributor tube 17, which abuts the shoulder 16 and is secured in place by cement 18.

Each distributor tube 17 is formed of relatively strong and flexible plastic tubing, such as of vinyl, polyethylene or polyurethane. It is essential that the diameter of the tubing be quite small; tests have indicated that tubing having a bore of approximately one-sixteenth of an inch and an overall diameter of one-eighth of an inch or slightly more is satisfactory.

A suitable filter, not shown, may be provided between the screwthreaded lower end 2 of the manifold body and the valve seat 4.

The irrigation system also includes a supply line 19 from which the risers 3 branch. The supply line terminates in a collector section 20 for sediment or particulate matter which preferably curves upwardly at its end and is closed by a cap 21. Particulate matter tends to flow along the supply line to the collector section as the water diverted to each riser is small in volume and thus flows upward at reduced velocity which causes the particulate matter to remain in the supply line or, if the particulate matter enters a riser, it tends to settle and return to the supply line.

Figures 4, 5:
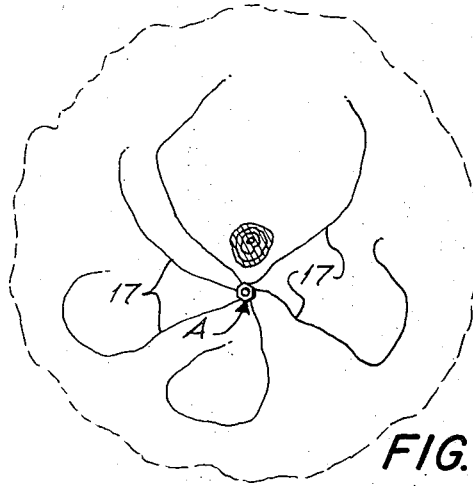
FIG. 4 is a further enlarged fragmentary sectional view thereof taken within circle 4 of FIG. 2.
FIG. 5 is an essentially diagrammatical plan view of the irrigation device at a reduced scale with a tree indicated partly in section and partly by broken lines.
Figure 7:
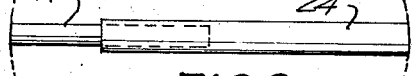
FIGS. 7 and 8 are enlarged fragmentary views thereof taken respectively within circles 7 and 8.
Figure 8:
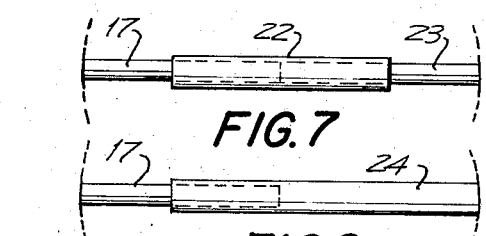

Operation of the irrigation system is as follows:

The irrigation system is preferably so arranged that the riser 3 is provided under each tree. An irrigation device A is mounted on each riser and various distributor tubes 17 are spread out under the corresponding tree so as to locate their discharge ends in a pattern suitable to effect relatively uniform distribution of water issuing from the extremities of the distributor tubes as indicated diagrammatically in FIG. 5. Some tubes may terminate relatively close to the trunk of the tree and other tubes may be arranged outwardly therefrom, as indicated in FIG. 5. The distributor tubes, being of small diameter, are sufficiently flexible that they conform to the surface of the ground under the tree; in fact, may be covered or partially covered by the soil surface and the usual debris thereon. When the irrigation system is turned on, the valve member 6 of each device is adjusted so that the water flowing from the ends of the distributor tubes is relatively slow and at low pressure. This is aided by the turbulent action in the chamber 11. Also, each distributor tube provides resistance to water flow so that the pressure at the end thereof is nominal.

Should the size of the tree or shrub not warrant use of all of the distributor tubes, one or more may be tied to form a knot, not shown. The knots may be tight so as to close off all flow or may be merely tight enough to restrict flow, thus further reducing the volume of water issuing from a particular distributor tube.

Because the distributor tubes are quite small in diameter, they are inexpensive so that each tube may be several feet long and thus actually form a resistance line and thus effectively reduce the water pressure at their discharge ends without restrictions that would tend to clog the system.

Figure 6:
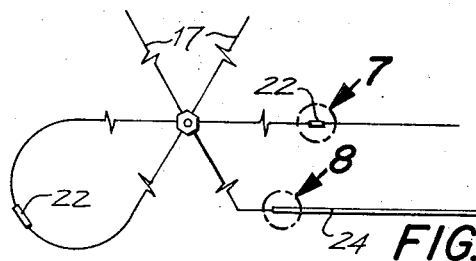
FIG. 6 is another essentially diagrammatical plan view of the irrigation device in which various modifications are indicated.
Figure 9:
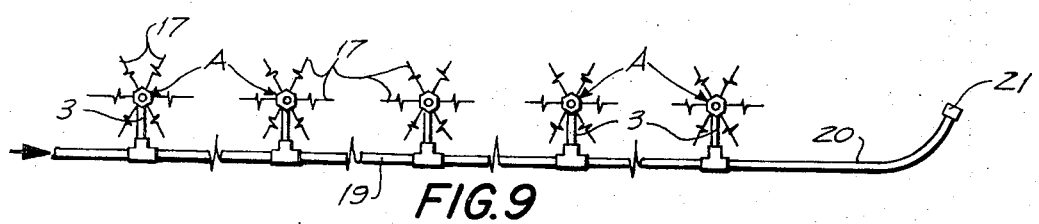
FIG. 9 is an essentially diagrammatical view of the irrigation system.

Other modifications of the distribution pattern may be readily accomplished. For example, two tubes 17 may be connected by a sleeve 22, thus closing off two tubes as shown in FIG. 6. If an extension indicated by 23 is needed, it may be joined to a selected tube by a sleeve 22, also as shown in FIG. 6. This will result, because of the added resistance, in further reduced flow at the discharge end of the extension 23. Such reduced flow may be minimized by use of a tube 24 of larger diameter, also as indicated in FIG. 6. For example, if the tube 17 has a bore of one-sixteenth inch, and an outside diameter of one-eighth inch, a tube 24 having a bore diameter of one-eighth inch may be used reducing the flow resistance to one-fourth the resistance in the tube 17.

Due to the fact that one valve controls a plurality of outlets, the flow passage through the valve is less likely to clog with particulate matter. Also, by reason of the turbulent flow induced by the toroidal chamber 11, the valve opening is further increased for a given discharge flow, further reducing the possibility of clogging. Finally, the provision in each supply line of means for flushing the line further insures trouble free operation.

While particular embodiments of this invention have been shown and described, it is not intended to limit the same to the details of the constructions set forth, but instead, the invention embraces such changes, modifications and equivalents of the various parts and their relationships as come within the purview of the appended claims.

I claim:

1. In an irrigation system, an irrigation device, comprising:
   a. a tubular body member having a first end adapted for connection to a water supply line, a valve seat inwardly from the first end, a manifold chamber inwardly from the valve seat, a plurality of restricted outlets radiating from the manifold chamber, and an internally screwthreaded second end;
   b. a valve screwthreaded in the second end and having a valve head cooperating with the valve seat;
   c. the valve and body member define a flow resistance chamber between the valve seat and manifold chamber in which turbulent water flow occurs to reduce the water pressure in the manifold chamber for a given inlet pressure and valve setting;
   d. and a set of distributor tubes connected to the outlets.

2. An irrigating device as defined in claim 1, wherein:

a. the distributor tubes are of small diameter to create a resistance to flow tending to create a back pressure in the manifold chamber and are of essentially the same length, thereby tending to cause essentially the same rate of low volume water discharge at low discharge pressure.

3. An irrigating device as defined in claim 1, wherein:

a. the extremities of the distributor tubes are connectable to tubes of larger diameter to extend the points of discharge with minimal increased flow resistance whereby discharge rates from distributor tubes so connected remain essentially the same as from distributor tubes not so connected.

4. An irrigating device as defined in claim 1, wherein:

a. pairs of distributor tubes are mutually connectable to provide a closed loop thereby to close off discharge therefrom and reduce the total water output from a selected irrigation device.

5. In an irrigation system, an irrigation device, comprising:

a. tubular body member having a first end adapted for connection to a water supply line, a valve seat inwardly from the first end, a toroidal chamber surrounding the valve seat, a manifold chamber inwardly from the toroidal chamber, a plurality of restricted outlets radiating from the manifold chamber, and an internally screwthreaded second end;

b. a valve screwthreaded in the second end and having a valve head cooperating with the valve seat including a curved peripheral portion complementing the toroidal chamber to cause toroidal water movement within the toroidal chamber the valve head forming with the manifold chamber a restricted outlet from the toroidal chamber whereby the toroidal water movement and flow past the valve head tends to produce reduced pressure and rate of flow in the manifold chamber for a given inlet pressure and valve setting;

c. and a setting of distributor tubes connected to the outlets.

6. An irrigation device as defined in claim 5, wherein:

a. the valve head and confronting wall of the manifold chamber are essentially frusto-conical and in parallel relation.

* * * * *